July 7, 1925.
T. P. TROKE
AXLE SHOCK ABSORBER CONSTRUCTION
Filed April 11, 1924
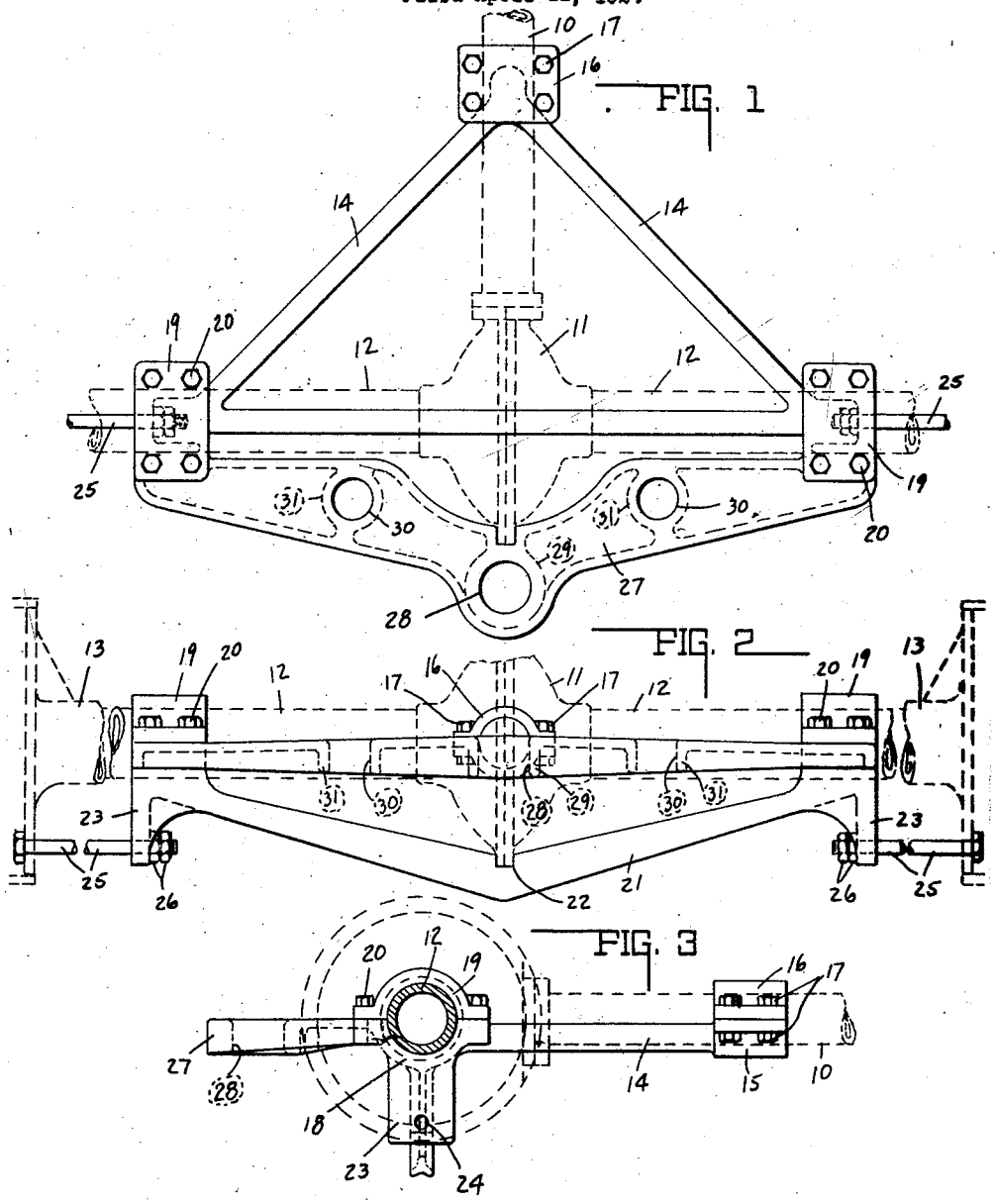
INVENTOR.
THOMAS P. TROKE.
BY
ATTORNEYS.

Patented July 7, 1925.

1,544,614

UNITED STATES PATENT OFFICE.

THOMAS P. TROKE, OF TOLEDO, OHIO.

AXLE SHOCK-ABSORBER CONSTRUCTION.

Application filed April 11, 1924. Serial No. 705,825.

*To all whom it may concern:*

Be it known that I, THOMAS P. TROKE, a citizen of the United States, and a resident of Toledo, county of Lucas, and State of Ohio, have invented a certain new and useful Axle Shock-Absorber Construction; and I do hereby declare that the following is a full, clear, and exact description thereof, reference being had to the accompanying drawings, in which like numerals refer to like parts.

This invention relates to a device for bracing a shaft driven axle.

The chief object of the invention is to construct a shock-distributor bracket for association with a shaft and an axle driven thereby and differentially connected, whereby distortion of the associated parts is prevented and the shock transmitted thereto is distributed throughout all of the members.

Another object of the invention is to associate with the aforesaid bracket a portion to be utilized for towing purposes.

The chief feature of the invention consists of a unitary triangular shaped bracket adapted to be associated with an axle, a shaft for driving the same, and a differential connecting the shaft and the axle.

The full nature of the invention will be understood from the accompanying drawings and the following description and claims:

In the drawings, Fig. 1 is a top plan view of the bracket and associated parts, the shaft axle and differential being shown dotted. Fig. 2 is a rear view of the same parts and shows the attachment associated with other parts of a vehicle. Fig. 3 is a side elevational view of the invention and the aforesaid parts.

In the drawings 10 indicates the drive shaft tube or housing which terminates in a differential housing 11 with which is associated the axle housing 12 that extends oppositely therefrom and in alignment therewith. These axle housings terminate in a rear axle housing brake flange 13, see Fig. 2.

The brace includes a pair of rods or bars 14 substantially triangular in cross section and these terminate in a semi-cylindrical bearing 15 with which is associated a complementary bearing cap 16 suitably secured thereto and in shaft encircling position by means of the bolts and nuts 17. The opposite ends of said rods or bars 14 terminate in similar bearings 18 with which are associated complementary bearing caps 19 also suitably secured thereto by the bolts 20. The bearings thus formed at opposite ends of the bracing bars 14 are connected together by a V-shaped brace 21 which extends downwardly from the bearings and towards the median plane thereof, being joined together adjacent the differential housing. Herein the junction is shown provided with a groove 22 to receive the flange of said housing. The cross section of the brace portion 21 is substantially triangular shaped. Depending from each of the bearings 18 is a bracket portion 23 which is apertured as at 24 to receive a bolt 25 having one end secured to the rear axle housing brake flange 13 and the other end adjustably secured to said flange 23 by the adjusting and locking nuts 26. By this arrangement the brace is adapted to be rigidly and medianly positioned with respect to the axle and the shaft driving the same.

Extending rearwardly from the axle supporting bearings is a triangular shaped towing extension 27 which is substantially channel-shaped in cross section and includes a median opening 28 defined by the wall 29 and the pair of side openings 30 defined by the walls 31.

While the invention has been described in great detail in the foregoing specifications, the same is to be considered illustrative and not restrictive in character, and the many modifications thereof which will readily suggest themselves to those skilled in the art to which this invention applies are all considered to be within the broad purview of this invention as outlined by the appended claims.

The invention claimed is:

1. The combination of an axle housing, a shaft housing, and a differential shock absorber construction comprising an open triangular framework anchored at each vertex to the shaft housing or axle housing and an angular brace separated from the framework except at a pair of vertices.

2. The combination of an axle housing, a shaft housing, and a differential shock absorber construction comprising an open triangular framework anchored at each vertex to the shaft housing or axle housing, and a pair of angular braces separated from each other and the framework but having common connections with the same at a pair of vertices.

3. A device of the character described in claim 2 characterized by the pair of braces lying at right angles to each other.

4. A device of the character described in claim 2 characterized by one of the braces lying at right angles to the plane of the framework and another lying parallel thereto.

In witness whereof, I have hereunto affixed my signature.

THOMAS P. TROKE.